(12) United States Patent
Brookins

(10) Patent No.: US 9,488,347 B1
(45) Date of Patent: Nov. 8, 2016

(54) LIGHTING SYSTEM

(71) Applicant: Keith Donald Brookins, Miami, FL (US)

(72) Inventor: Keith Donald Brookins, Miami, FL (US)

(*) Notice: Subject to any disclaimer, the term of this patent is extended or adjusted under 35 U.S.C. 154(b) by 236 days.

(21) Appl. No.: 14/052,888

(22) Filed: Oct. 14, 2013

(51) Int. Cl.
| | | |
|---|---|---|
| *E04D 13/00* | (2006.01) | |
| *E04H 15/10* | (2006.01) | |
| *E05B 17/10* | (2006.01) | |
| *F21S 4/00* | (2016.01) | |
| *F21V 5/00* | (2015.01) | |
| *G09F 13/26* | (2006.01) | |
| *F21V 21/00* | (2006.01) | |
| *F21W 111/04* | (2006.01) | |
| *F21V 8/00* | (2006.01) | |
| *F21S 8/08* | (2006.01) | |
| *F21V 33/00* | (2006.01) | |

(52) U.S. Cl.
CPC ............... *F21V 21/00* (2013.01); *F21S 4/20* (2016.01); *F21S 4/22* (2016.01); *F21S 4/26* (2016.01); *F21S 8/083* (2013.01); *F21V 33/006* (2013.01); *F21W 2111/04* (2013.01); *G02B 6/001* (2013.01); *G02B 6/0008* (2013.01)

(58) Field of Classification Search
CPC ............... F21W 2111/047; F21W 2111/02; F21W 2121/00; F21W 2121/004; F21W 2131/10; F21W 2131/101; F21W 2131/103; F21W 2131/105; F21W 2131/107; F21W 2131/109; F21W 2111/04; F21W 2111/043; G02B 6/001; G02B 6/0008; G02B 6/486; G02B 6/504; G02B 6/506; G02B 6/54; F21V 33/006; F21V 21/116; F21V 21/0824; F21S 4/007; F21S 6/005; F21S 6/003; F21S 6/002; F21S 4/26; F21S 4/22; F21S 4/20; E04F 2011/1872; F21Y 2111/005; F21Y 2111/007

USPC ........ 362/581, 559, 565, 152, 431, 555, 576; 405/211.1, 216

See application file for complete search history.

(56) References Cited

U.S. PATENT DOCUMENTS

| | | | | |
|---|---|---|---|---|
| 4,394,714 A | * | 7/1983 | Rote | ............................. 362/576 |
| 5,392,204 A | * | 2/1995 | Schumaker | ............. F21S 6/002 362/294 |
| 5,680,496 A | * | 10/1997 | Burkitt, III | ............ G02B 6/001 362/36 |
| 5,853,167 A | * | 12/1998 | West | ...................... E04H 17/20 256/19 |
| 6,585,398 B1 | * | 7/2003 | Haddad | ......................... 362/328 |

(Continued)

*Primary Examiner* — Renee Chavez
*Assistant Examiner* — James Endo
(74) *Attorney, Agent, or Firm* — Albert Bordas, P.A.

(57) ABSTRACT

A lighting system that provides radial and down lighting for dock piles and dock platforms. The lighting system has a cone assembly, a base that mounts onto a dock pile, and an electrical system having at least one light source. A tip cone is mounted onto the cone assembly and may have at least one light slot to emit light from the at least one light source. The tip cone and cone assembly are apex shaped. Extending from the tip cone is a mast bolt that secures to the base and may secure the at least one light source. The lighting system may also have at least one flat mold, and at least one corner mold. Each has at least one channel to receive at least one optic fiber, color bead, and/or rope lighting. A pile wrap assembly has at least two wraps that join around each dock pile.

10 Claims, 17 Drawing Sheets

(56) References Cited

U.S. PATENT DOCUMENTS

| | | | |
|---|---|---|---|
| 7,114,826 B1* | 10/2006 | Lilly | 362/146 |
| 7,661,837 B1* | 2/2010 | Pever et al. | 362/152 |
| 2002/0145878 A1* | 10/2002 | Venegas, Jr. | E01F 9/016 |
| | | | 362/431 |
| 2002/0148183 A1* | 10/2002 | Grant | F21S 8/081 |
| | | | 52/300 |
| 2003/0133311 A1* | 7/2003 | Robertson et al. | 362/555 |
| 2004/0095781 A1* | 5/2004 | Lo | 362/555 |
| 2004/0109316 A1* | 6/2004 | Lin | 362/253 |
| 2005/0201089 A1* | 9/2005 | Lee | 362/227 |
| 2006/0002116 A1* | 1/2006 | Lin | F21V 1/00 |
| | | | 362/351 |
| 2006/0109648 A1* | 5/2006 | Trenchard | F21V 5/045 |
| | | | 362/227 |
| 2006/0245205 A1* | 11/2006 | Hughes et al. | 362/576 |
| 2009/0086503 A1* | 4/2009 | Trujillo | 362/605 |
| 2009/0237949 A1* | 9/2009 | Nichols | B63B 45/04 |
| | | | 362/477 |
| 2010/0061091 A1* | 3/2010 | Galipeau et al. | 362/234 |
| 2010/0265736 A1* | 10/2010 | Fox | 362/565 |
| 2011/0051421 A1* | 3/2011 | Chew | F21V 15/00 |
| | | | 362/249.06 |
| 2013/0208454 A1* | 8/2013 | Chen | F21S 9/035 |
| | | | 362/183 |

* cited by examiner

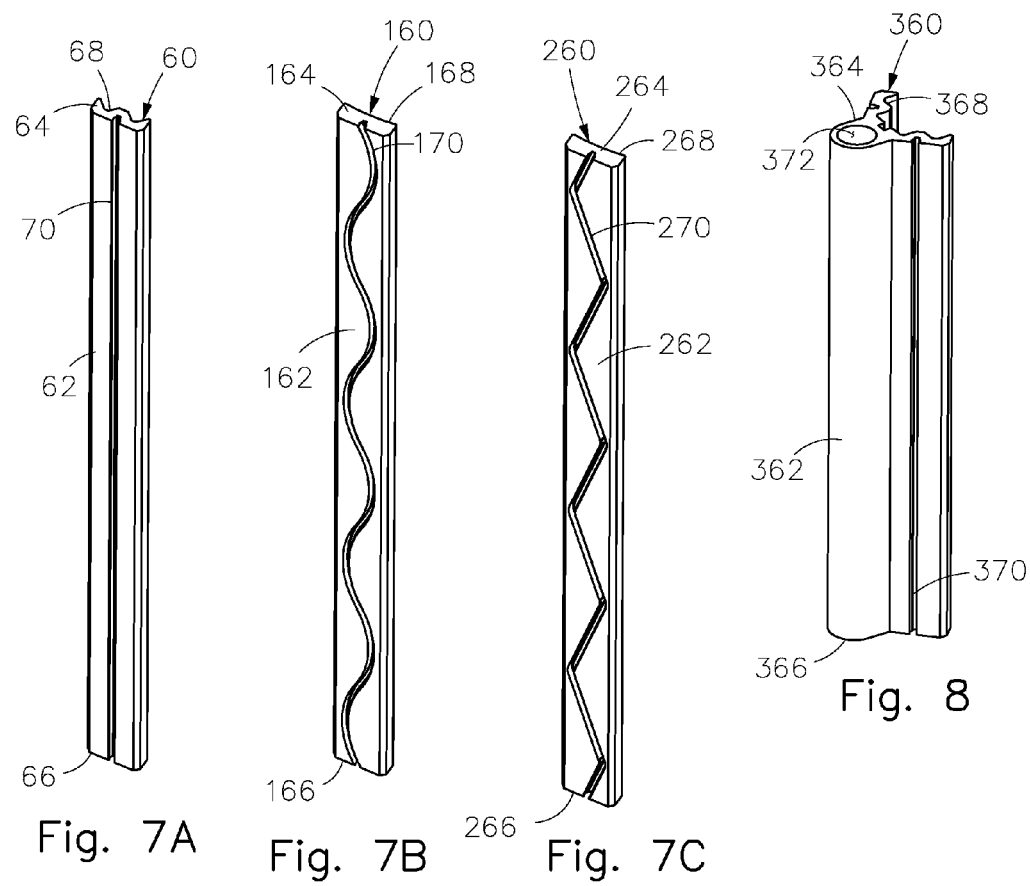
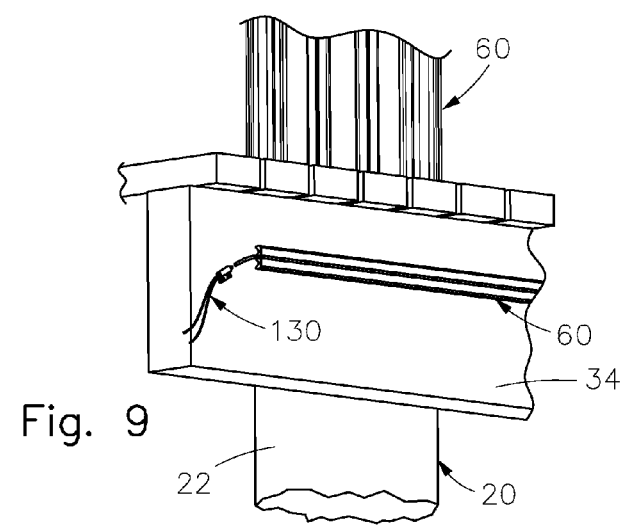

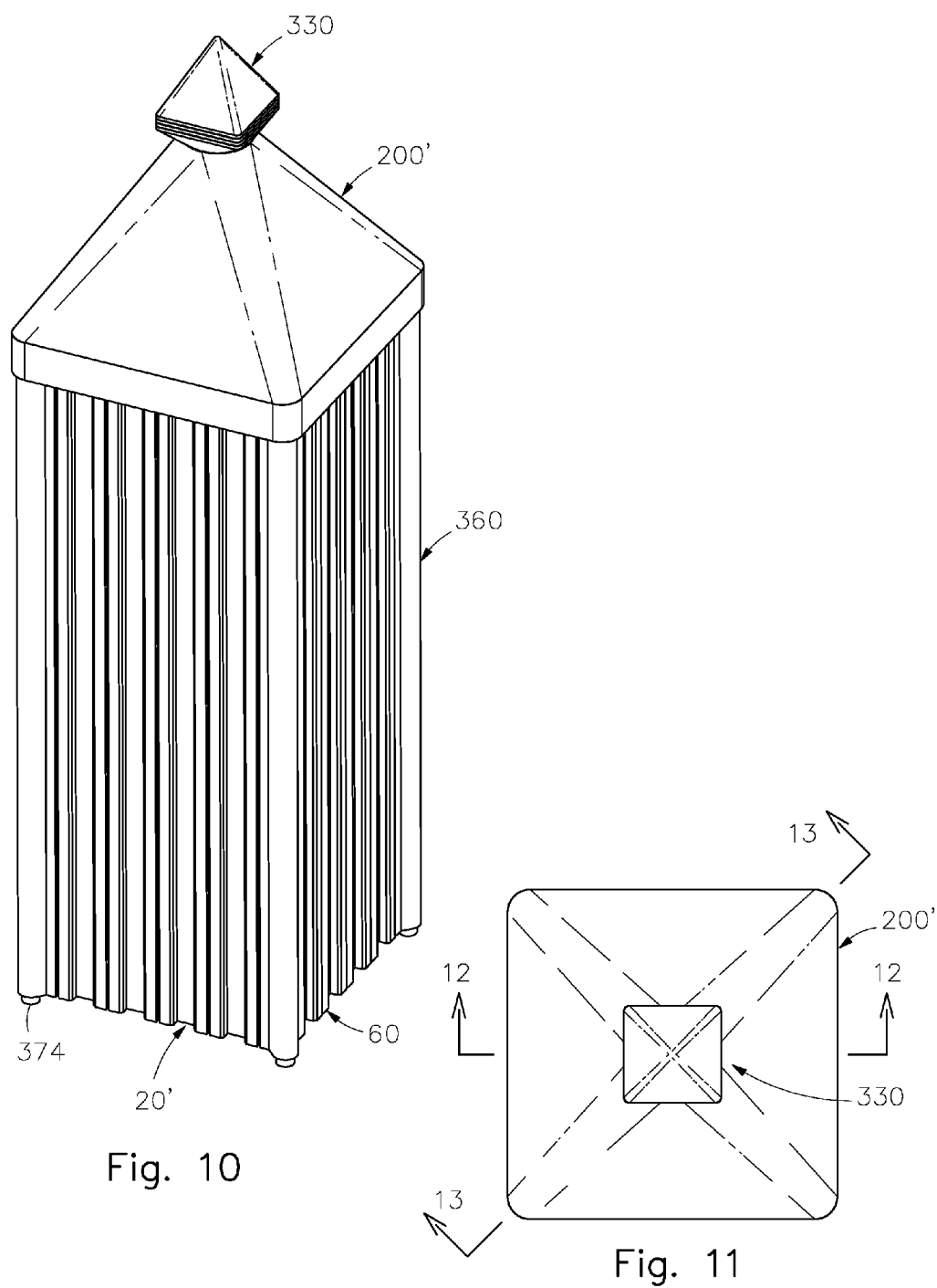

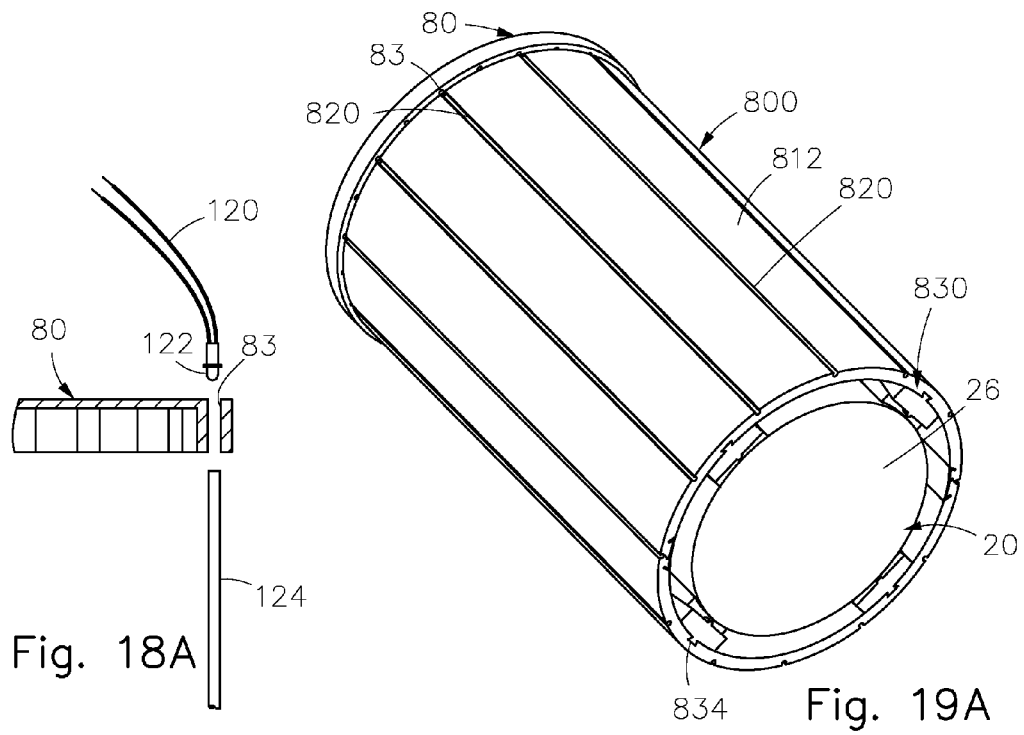
Fig. 18A
Fig. 19A
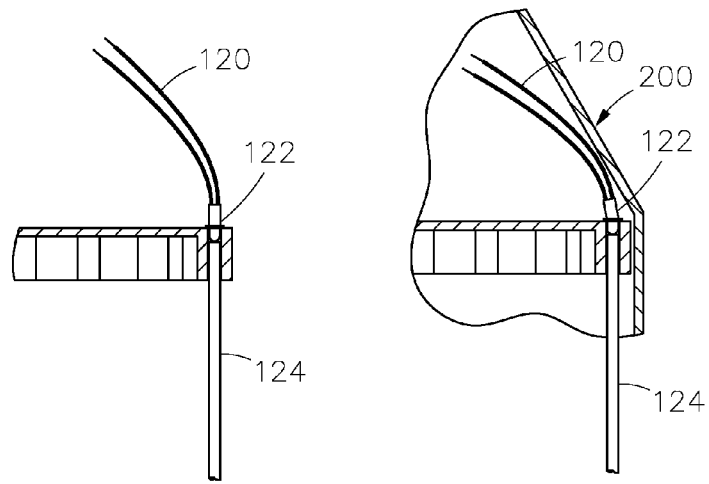
Fig. 18B
Fig. 18C

LIGHTING SYSTEM

BACKGROUND OF THE INVENTION

1. Field of the Invention

The present invention relates to lighting systems, and more particularly, to lighting systems that provide radial and down lighting for dock piles and dock platforms.

2. Description of the Related Art

Applicant is not aware of any lighting systems for dock piles and dock platforms suggesting the novel features of the present lighting system.

SUMMARY OF THE INVENTION

The present invention is a lighting system that provides radial and downward lighting for dock piles and dock platforms. It is shaped to deter bird loitering and to keep water out of the end grain of wood dock piles. Further, it houses and accommodates light sources utilizing a unique mast bolt design, and a unique two-piece cone system defined as a cone assembly and a tip cone. The present invention conceals all mounting hardware.

A cone assembly houses an electrical system comprising the light sources. Light sources can be light modules that are properly separated using tube spacers over the mast bolt to allow proper alignment to optic fibers, or can be screwed down on an all threaded mast bolt to a desired height. Other spacers raise up the light modules for providing light to a tip cone that is made of a clear material to allow direct and/or indirect bottom lighting to illuminate the tip cone by shining light up, or bringing light to the bottom through the optic fibers. As an example, light sources of the present invention can be, but are not limited to, MR-16 halogen, MR-16 LED, LED direct, LED driven optic fibers or any combination. Light source locations can be attached to the mast bolt, attached to the top of a base plate, attached to the bottom of the base plate, attached to a bottom edge of a base or though the bottom edge of the base. Light distribution of the present invention can be, but are not limited to, MR-16 halogen, MR-16 LED, LED direct, LED driven optic fibers or any combination. When optic fibers are used, they can be terminated with a light stencil to display a message and/or shape onto a surface below. In a preferred embodiment, the present invention is operated with low voltage.

Removable tip cones come in a variety of styles, colors and functions including indirect lighting features. The tip cones screw down onto the mast-bolt to secure the present invention. Multiple choices in lighting sources allow a version for every budget.

Tucked under a bottom edge of the cone assembly, and attached to a dock pile, is an optional rubber or PVC flat mold that may run down the dock pile. It may run in any direction or pattern including, but not limited to vertically and spiraling. The flat mold allows easy installation on uneven surfaces and flexibility unequaled in wood. The flat mold is hollowed on a backside to hide wiring and allows for tight fits, even at small diameters. The flat mold has a channel running down its front-side that allows installation hardware to be hidden inside the channel prior to the insertion of at least one optic fiber, color bead, and/or rope lighting, which in turn hides the installation hardware. Flat mold is intended to act as a bumper to reduce damage if struck. When using optical fiber in the flat mold, it can be light sourced from inside the cone assembly by various methods depending on budget and desired effects. The flat mold can also be used in a horizontal orientation to border a dock platform, to illuminate steps, and/or to illuminate an over hang for safety and esthetics.

The dock piles can also simply be down washed with light from LEDs in the outer edge of the base, and are hidden by a vertical lip of the cone assembly. However, the dock piles can be both down washed between molds and illuminated with optic fiber lights in the flat mold at the same time. In addition to down washing from under the base with LEDs, optic fiber can be terminated at the base's lower edge to wash. It also seals the base hole flush so that insects will not be tempted to nest or otherwise cover the light source.

A base plate allows for multi-point leveling and small height adjustments prior to securing it to the dock piles and mounting of each respective mast bolt, whereby the mast bolt is also used to stabilize light sources. The base cone is designed with stop tabs to insure good transfer of down pressure from the tip cone through the mast bolt and lock in place to assure the base does not turn after securing.

An alternate embodiment of the present invention fits onto square dock piles. This alternate embodiment has all the features of the present invention with the addition of a specialized corner mold intended to act as a bumper to reduce impact damage, match flat molding, hide PVC pipe in the molding and channeled for at least one optic fiber, color bead, and/or rope lighting.

The present invention also comprises a pile wrap assembly for further protection and esthetic pleasure. The pile wrap assembly also provides a multi-piece solution for problems that occur when trying to apply a surface to a dock pile where a power or water outlet has been installed by allowing notching to accommodate. The pile wrap assembly can offer many looks and themes that are both natural and artistic, it also protects the dock pile while hiding all that is attached to it. The pile wrap assembly further provides symmetry to girth and height while allowing adjustments to plumb while hiding imperfections. It secures quickly and does not rust. The pile wrap assembly may feature as a hose hanger, excess rope holder, etc. Seams of the pile wrap assembly are kept in proper alignment by interlinking shape and are kept together by a PVC channel. Opposing wedges between a bottom section of the pile wrap assembly and the dock pile fill space to restrict movement. The top section of the pile wrap assembly utilizes a lip that secures snug into a groove under an outer edge of the base plate. The pile wrap assembly allows for optic fiber inlay allowing them to be lit. The pile wrap assembly may also be drilled to allow a well placed optic fiber to illuminate a specific or strategic point. Some pile wrap assemblies will be washed with down light from under the outer edge of the cone assembly or base plate. The light source can be incandescent, halogen, xenon or LED either directly or through an optic fiber. The pile wrap assembly is weather resistant, durable, easy to clean, pressure cleanable, paintable, easily customized, accessorized, chemical resistant, and is easy and economical to change themes. Installation does not require holes in the dock platform, nor in the side of the dock pile.

It is therefore one of the main objects of the present invention to provide a lighting system that provides radial and down lighting for dock piles and dock platforms.

It is another object of the present invention to provide a lighting system that comprises a unique two-piece cone system defined as a cone assembly and a tip cone.

It is another object of the present invention to provide a lighting system that houses and accommodates light sources utilizing a unique mast bolt design.

It is another object of the present invention to provide a lighting system shaped to deter bird loitering.

It is another object of the present invention to provide a lighting system to keep water out of the end grain of wood dock piles.

It is another object of the present invention to provide a lighting system that conceals all mounting hardware.

It is another object of this invention to provide a lighting system that can be readily assembled, installed and disassembled.

It is another object of this invention to provide a lighting system that is rust free, whereby system parts do not rust.

It is another object of this invention to provide a lighting system that provides multi-layers of function including independently functioning light sources and styles.

It is another object of this invention to provide a lighting system that provides controllability, which in turn is function.

It is another object of this invention to provide a lighting system that does not over light, rob night vision, or commit light pollution.

It is another object of this invention to provide a lighting system that is highly efficient, utilizing low voltage LED lighting.

It is another object of this invention to provide a lighting system that is waterproof and submersible.

It is another object of this invention to provide a lighting system that comprises light stencils.

It is another object of this invention to provide a lighting system, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 7A is an isometric view of a first flat mold demonstrating a pattern for at least one optic fiber, color bead, and/or rope lighting.

FIG. 7B is an isometric view of a second flat mold demonstrating a pattern for at least one optic fiber, color bead, and/or rope lighting.

FIG. 7C is an isometric view of a third flat mold demonstrating a pattern for at least one optic fiber, color bead, and/or rope lighting.

FIG. 8 is an isometric view of a corner mold demonstrating a pattern for at least one optic fiber, color bead, and/or rope lighting.

FIG. 9 is a partial isometric view, showing flat molding horizontally oriented on dock joist and single source light module.

FIG. 10 is an isometric view of a square dock pile having vertically mounted flat mold, and corner mold, showing the abilities of rubber or plastic flat mold in design, function and esthetics as well as housing at least one optic fiber, color bead, and/or rope lighting, while functioning as a bumper and concealing mounting hardware.

FIG. 11 is top view of the cone assembly and tip cone seen in FIG. 10.

FIG. 18A is an isometric view of a section of the LED module aligned with a base.

FIG. 18B is an isometric view of the section of the LED module seen in FIG. 18A inserted into the base and in alignment.

FIG. 18C is an isometric view of the LED module seen in FIG. 18B inserted into the base and having a cone assembly mounted thereon.

FIG. 19A is a bottom isometric view of a dock pile having pile wrap assembly secured thereon.

DETAILED DESCRIPTION OF THE PREFERRED EMBODIMENT

Figure 1:
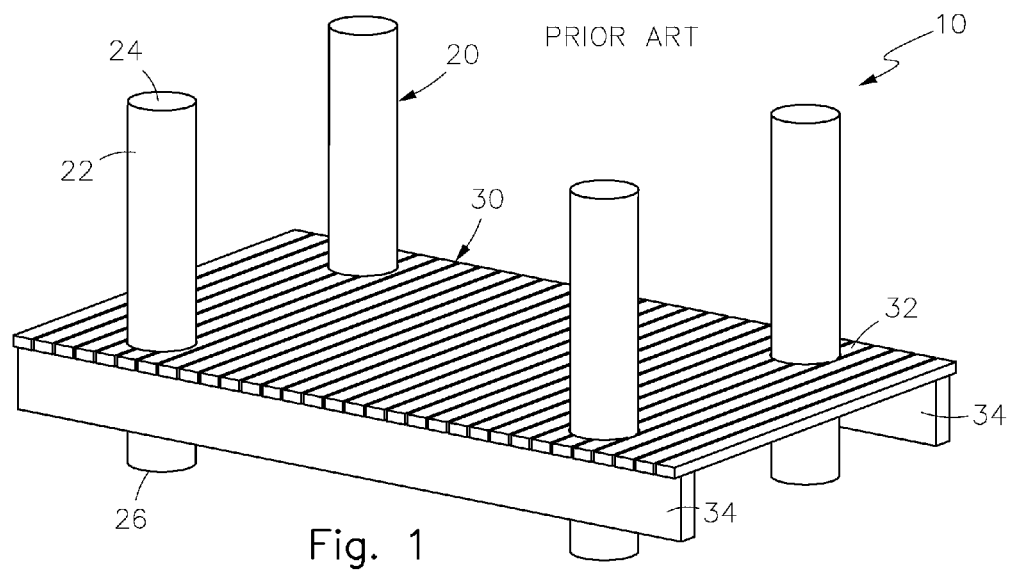
FIG. 1 is an isometric view of a prior art dock platform with four undressed dock piles.

Referring now to the drawings, the present invention is a lighting system and is generally referred to with numeral 50. It can be observed that it basically includes cone assembly 200, tip cone 230, mast bolt 90, base 80, electrical system 100, flat mold 60, and pile wrap assembly 800.

As seen in FIG. 1, prior art 10 comprises dock platform 30 having decking 32 and joists 34. Dock platform 30 further has dock piles 20 comprising sidewall 22 extending between top end 24 and bottom end 26. Prior art 10 teaches dock piles 20 to be made of wood or cement.

Figure 2:
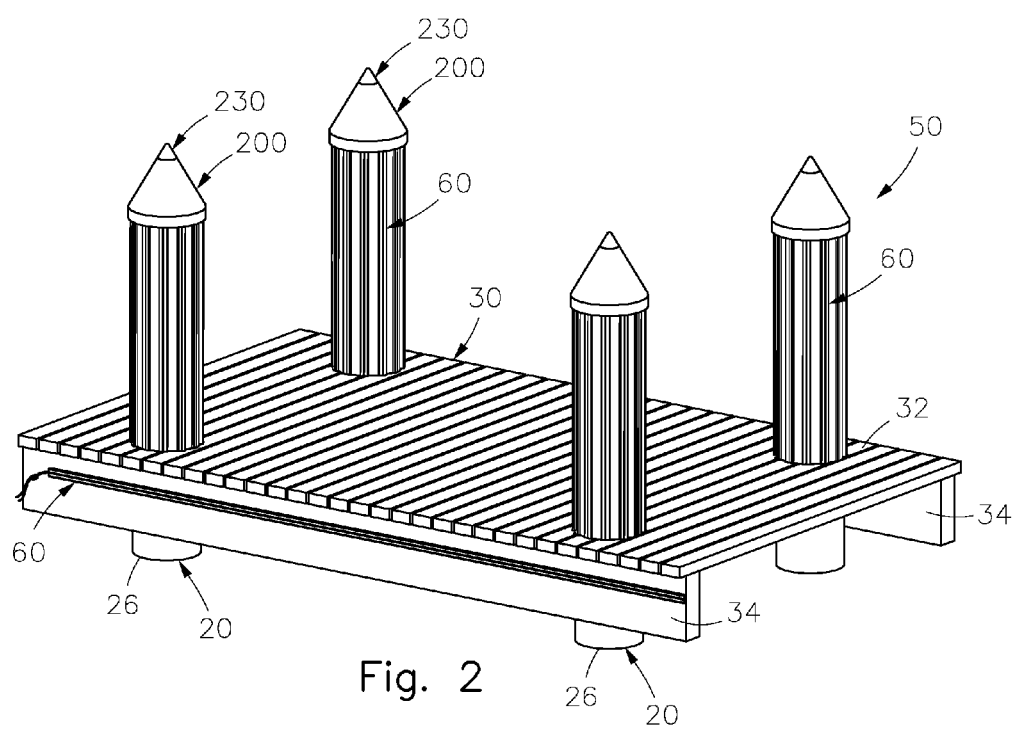
FIG. 2 is an isometric view of one of the preferred embodiments of the present invention mounted onto the dock platform and the dock piles.

As seen in FIG. 2, present invention 50 is mounted onto dock piles 20 that support dock platform 30. As seen in this illustration, tip cone 230 is mounted upon cone assembly 200, and flat mold 60 extends from cone assembly 200 to decking 32. Flat mold 60 may also be mounted onto joists 34. Cone assembly 200 provides a weather resistant cavity to house lighting options. It is noted that cone assembly 200 and tip cone 230 may take any ornamental shape. However, in a preferred embodiment, they are apex shaped in an effort to deter bird loitering and to keep water out of the end grain of wood dock piles 20.

Figure 3A:
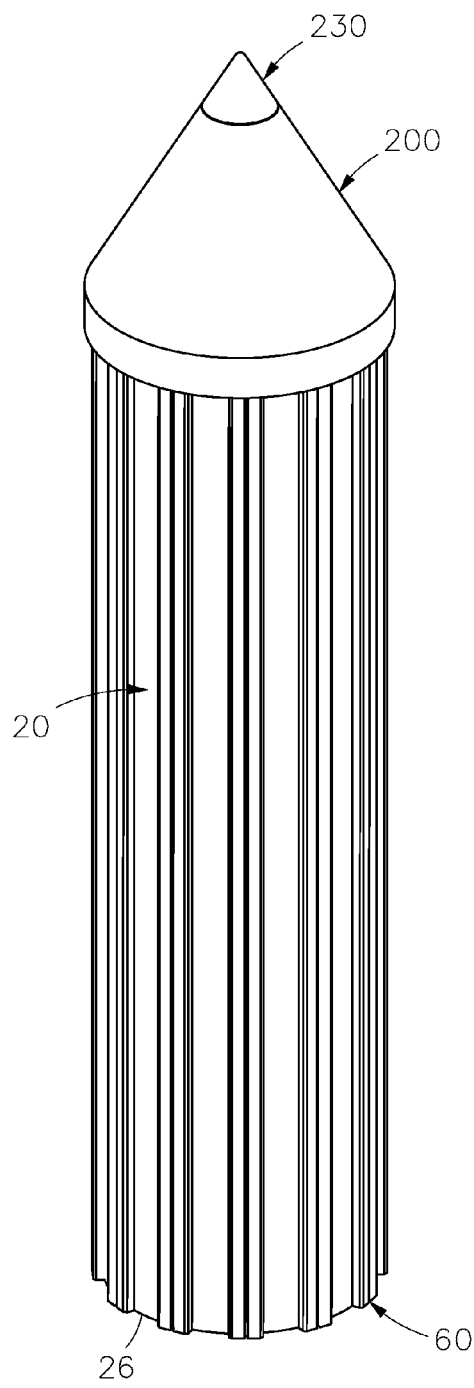
FIG. 3A is an isometric view of a dock pile having vertically mounted flat mold, showing the abilities of rubber or plastic flat mold in design, function and esthetics as well as housing at least one optic fiber, color bead, and/or rope lighting, while functioning as a bumper and concealing mounting hardware.

As seen in FIG. 3A for illustrative purposes, flat mold 60 may be vertically mounted onto dock pile 20. In a preferred embodiment, flat mold 60 is manufactured of rubber and/or plastic materials, or of other materials having similar characteristics, to effectively house at least one optic fiber, color bead, and/or rope lighting, and function as a bumper.

Figure 3B:
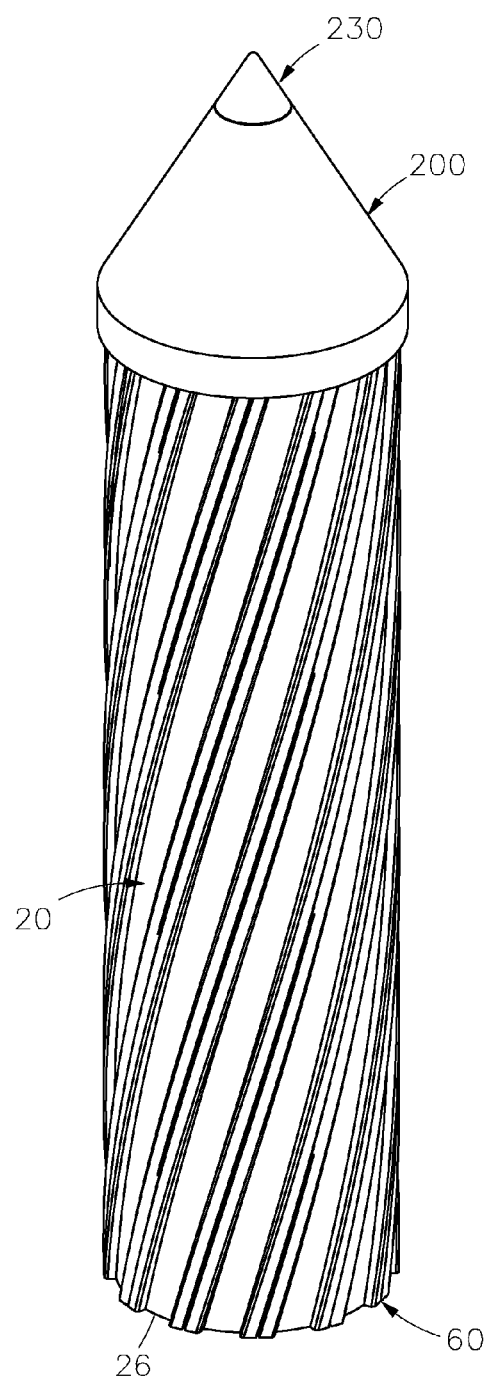
FIG. 3B is an isometric view of a dock pile having diagonally mounted flat mold, showing the abilities of rubber or plastic flat mold in design, function and esthetics as well as housing at least one optic fiber, color bead, and/or rope lighting, while functioning as a bumper and concealing mounting hardware.

As seen in FIG. 3B for illustrative purposes, flat mold 60 may be diagonally mounted onto dock pile 20. It is noted that flat mold 60 may be mounted onto dock pile 20 in any pattern or shape.

Figure 4A:
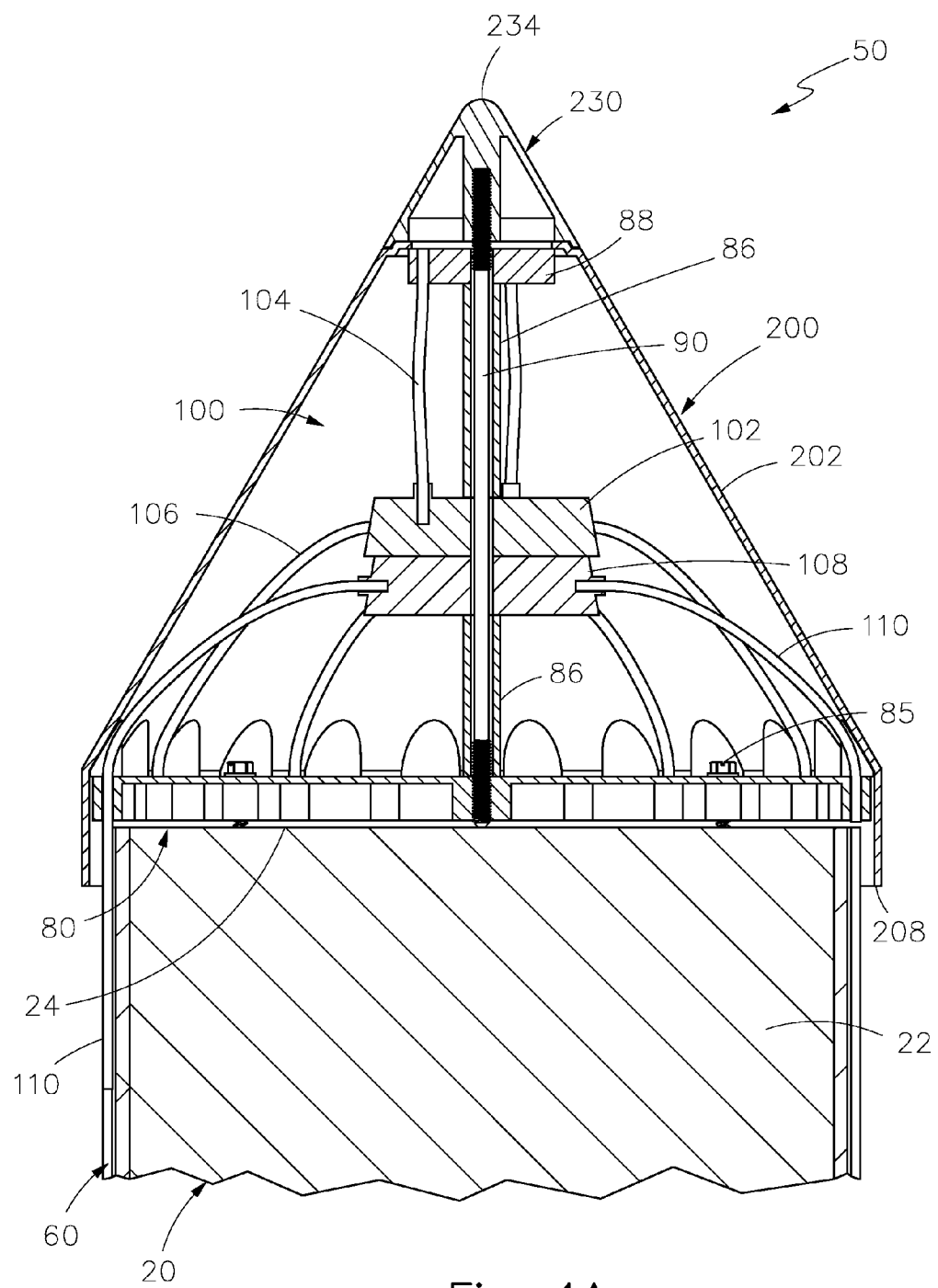
FIG. 4A is a partial cross-section view of a cone assembly housing an optic fiber electrical system.

As seen in FIG. 4A, present invention 50 is mounted onto a dock pile 20, whereby tip cone 230 is mounted upon cone assembly 200 which houses electrical system 100. In a preferred embodiment, tip cone 230 is screwed down to cone assembly 200, pulling it snugly to base 80 with mast bolt 90. It is noted that mast bolt 90 can be entirely, or partially threaded as illustrated. Base 80 secures directly onto top end 24 of dock pile 20, and allows rigging of optic fiber and light modules prior to placement of cone assembly 200. Mast bolt 90 also supports light modules 102 and 108 in a centerline of cone assembly 200 and elevates each item to its desired height by use of spacers 86 or mast bolt 90 threads. Light module 102 is shown with optic fibers 104 plugged therein to illuminate tip cone 230. In addition, light modules 102 and 108 are shown with optic fibers 106 and 110 respectively passing through an outer edge of plate 82, seen in FIG. 5, or an inner edge of cone assembly 200 where it can be cut flush with a bottom edge to wash dock pile 20 with light or continue down dock pile 20 in flat mold 60, or alternating both. Also shown is optic fiber 110 passing to flat mold 60.

Figure 4B:
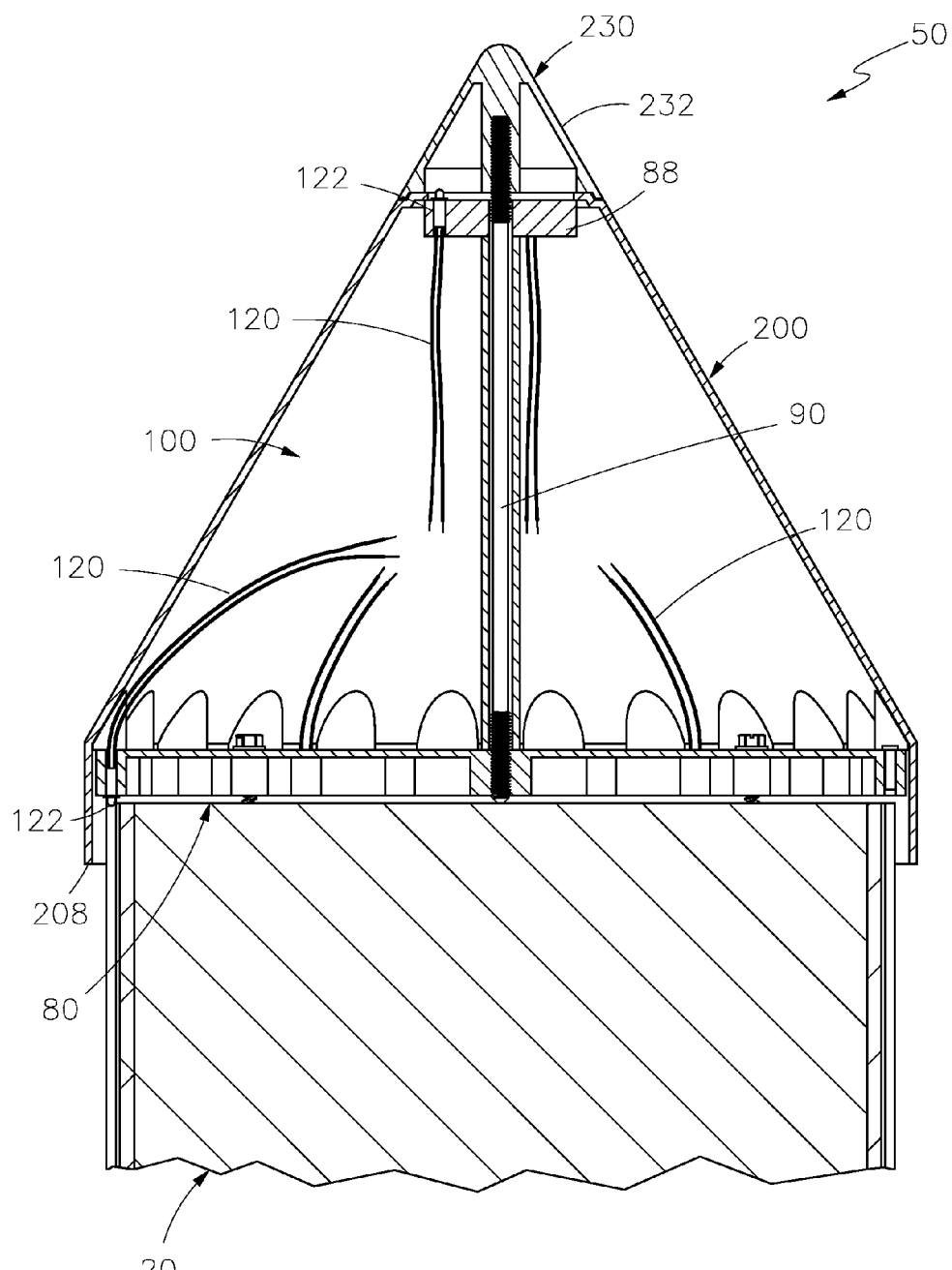
FIG. 4B is a partial cross-section view of a cone assembly housing LED modules.

As seen in FIG. 4B, present invention 50 is mounted onto a dock pile 20, whereby tip cone 230 is mounted upon cone assembly 200 which houses an alternate embodiment of electrical system 100 showing LED module 120 for direct LED lighting to tip cone 230. It is noted that LED module 120 is supported by optic aligner 88 and LED 122, and also light to the bottom of base 80 down washing dock pile 20. LED module 120 all ties to a power source inside cone assembly 200. In a preferred embodiment, LED module 120 comprises wiring connections and a current limiter poured into an epoxy mold designed to plug into a base 80 or optical aligner 88. As seen in this illustration, optic aligner 88 is biased towards tip cone 230 with mast bolt 90.

Electrical system 100 may further comprise inferred lighting for camera surveillance after lights-out and change light color to accommodate local turtle light laws. RF remote control RGB controllers, WI-FI RGB controllers, or smart home systems may control present invention 50. Controllers can dim, blink, strobe, control color selection, vary from color to color, or react to sound. A "react to sound" operation will change color and brightness as volume and frequency change. It can be fed by input or listen with a built-in microphone.

Figure 5:
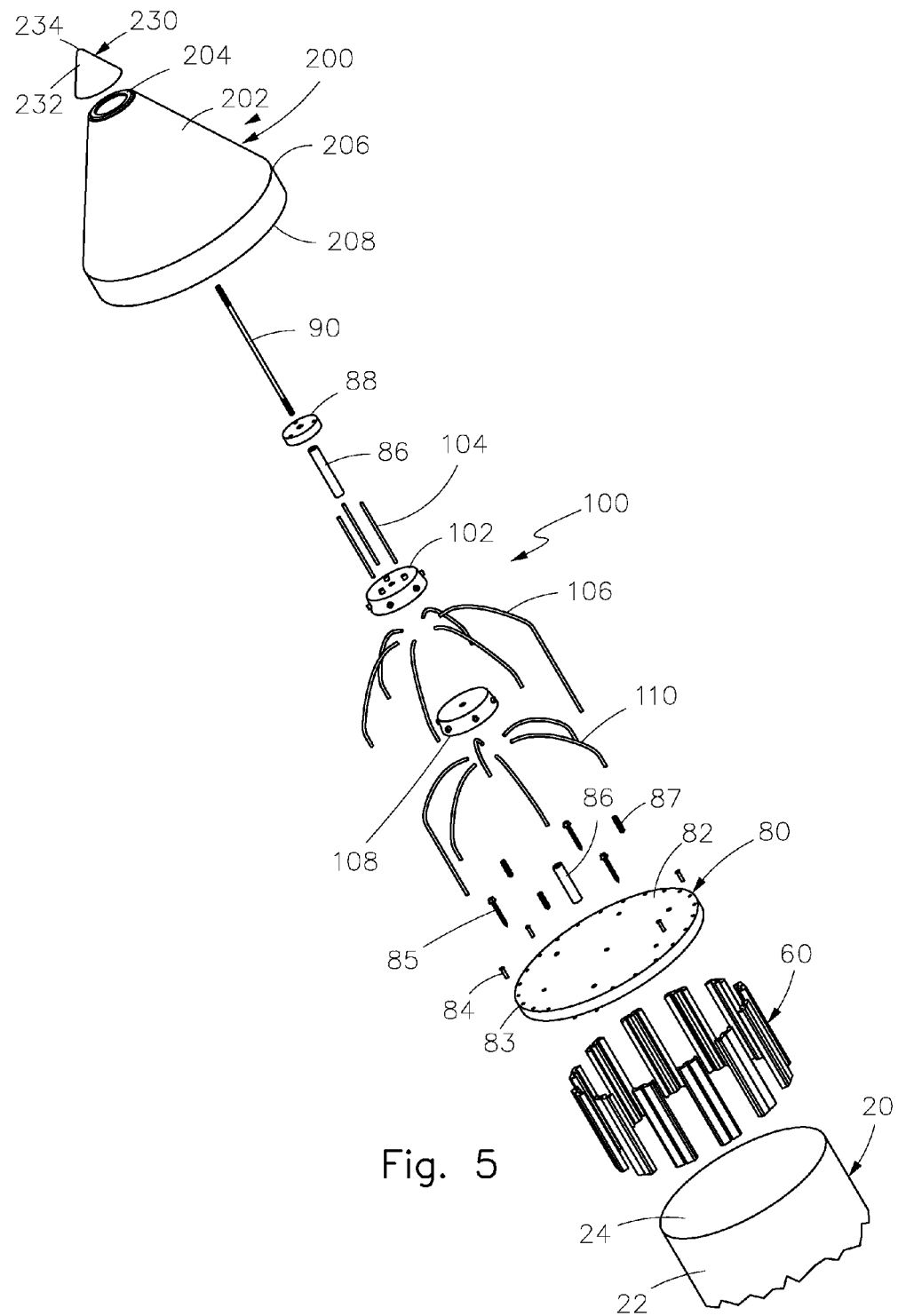
FIG. 5 is a top isometric exploded view of the present invention.
Figure 6:
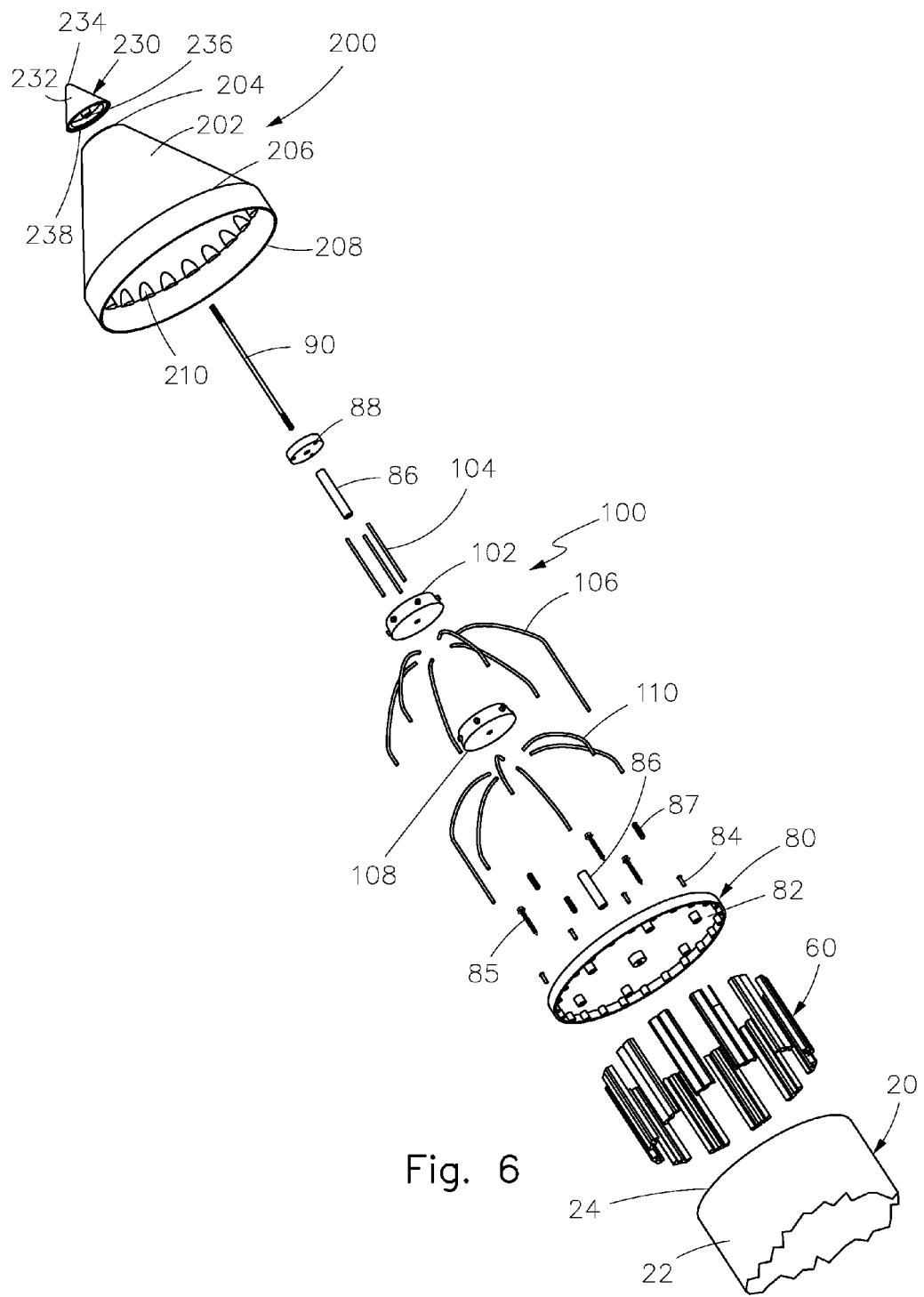
FIG. 6 is a bottom isometric exploded view of the present invention.

As seen in FIGS. 5 and 6, tip cone 230 comprises sidewall 232 extending from end 234 to edge 238. Tip cone 230 also comprises threaded hole 236 to receive mast bolt 90.

Cone assembly 200 comprises sidewall 202 extending from top edge 204 to bottom edge 208, and may have transition edge 206. Cone assembly 200 also comprises stop tabs 210 to securely distribute down force by tip cone 230, thus locking into base 80 to prevent turning or rotation. Cone assembly 200 houses mast bolt 90, which extends from tip cone 230 to base 80. Secured by mast bolt 90 are optical aligner 88, spacers 86, and light modules 102 and 108. Extending from light modules 102 and 108 are optic fibers 106 and 110 respectively.

Mounting hardware includes plugs 84, mounting screws 85, spacers 86, and levelers 87 to level, rise or lower an overall height of cone assembly 200.

Base 80 comprises plate 82 having a plurality of holes 83, any of which may receive optic fiber 110 in the illustrated embodiments. As seen in FIG. 7A, flat mold 60 comprises exterior face 62 and interior face 68 extending between top end 64 and bottom end 66. Flat mold 60 further comprises a first design pattern, whereby channel 70, on exterior face 62, receives at least one optic fiber, color bead, and/or rope lighting, and hides and accommodates mounting hardware.

As seen in FIG. 7B, similar to flat mold 60, flat mold 160 comprises exterior face 162 and interior face 168 extending between top end 164 and bottom end 166. Flat mold 160 further comprises a second design pattern, whereby channel 170, on exterior face 162, receives at least one optic fiber, color bead, and/or rope lighting, and hides and accommodates mounting hardware.

As seen in FIG. 7C, similar to flat mold 60, flat mold 260 comprises exterior face 262 and interior face 268 extending between top end 264 and bottom end 266. Flat mold 260 further comprises a third design pattern, whereby channel 270, on exterior face 262, receives at least one optic fiber, color bead, and/or rope lighting, and hides and accommodates mounting hardware.

As seen in FIG. 8, corner mold 360 comprises exterior face 362 and interior face 368 extending between top end 364 and bottom end 366. Corner mold 360 further comprises a design pattern, whereby channel 370 receives at least one optic fiber, color bead, and/or rope lighting, and hides and accommodates mounting hardware. Corner mold 360 further comprises elongated cavity 372 to receive conduit 374, seen in FIG. 10. It is noted that flat molds 60, 160, 260 and corner mold 360 may comprise any number of design patterns, whereby a respective channel may receives at least one optic fiber, color bead, and/or rope lighting, and hides and accommodates mounting hardware. In addition, flat mold 60 and corner mold 360 may also be transparent or clear for desirable light properties.

As seen in FIG. 9, flat mold 60 comprising single source light module 130 may be mounted onto joists 34.

As seen in FIGS. 10 and 11, tip cone 330 is mounted upon cone assembly 200', and for illustrative purposes, flat mold 60 and corner mold 360 are vertically mounted onto square dock pile 20'. In a preferred embodiment, flat mold 60 and corner mold 360 are manufactured of rubber and/or plastic materials, or of other materials having similar characteristics, to effectively house at least one optic fiber, color bead, and/or rope lighting, and hides and accommodates mounting hardware.

Figure 12:
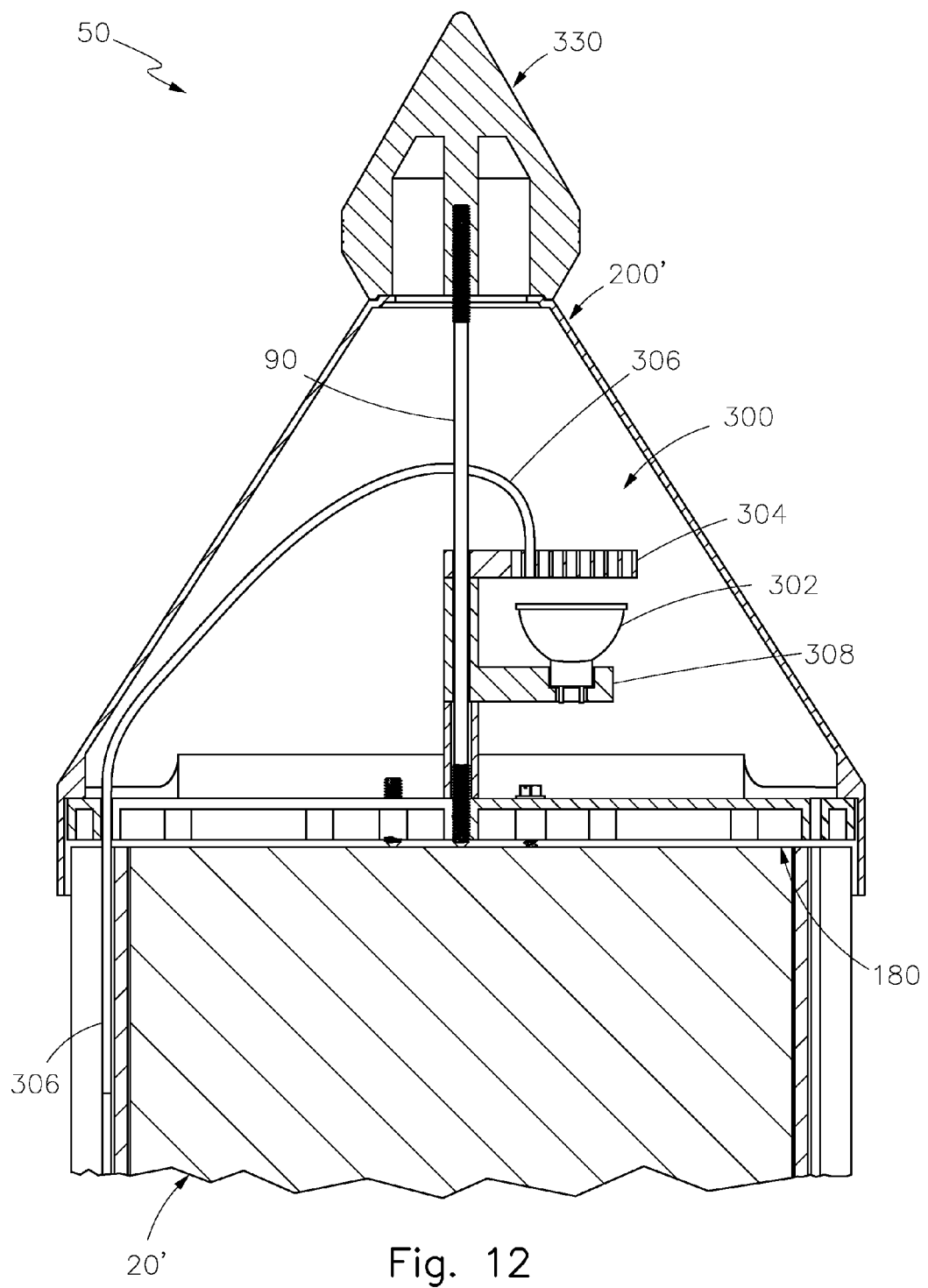
FIG. 12 is a partial cross-section view taken along lines 12-12 from FIG. 11.
Figure 13:
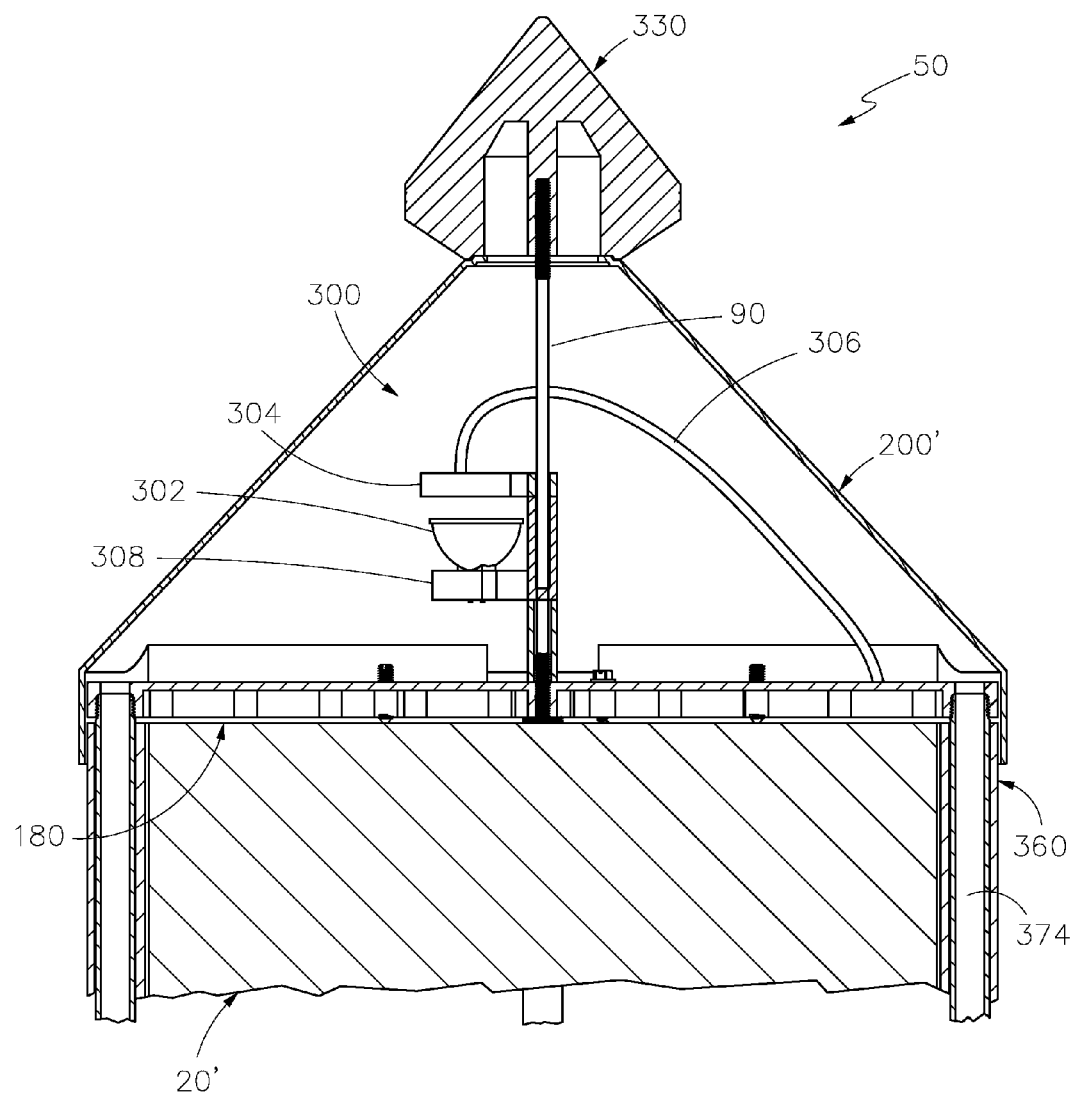
FIG. 13 is a partial cross-section view taken along lines 13-13 from FIG. 11.

As seen in FIGS. 12 and 13, present invention 50 is mounted onto a square dock pile 20', whereby tip cone 330 is mounted upon cone assembly 200' which houses electrical system 300. In a preferred embodiment, tip cone 330 is screwed down to cone assembly 200', pulling it snugly to base 180 with mast bolt 90. Mast bolt 90 also supports optic aligner 304, and bulb base 308 for bulb 302. From optic aligner 304, optic fiber 306 extends through base 180 and is received by channel 370 of corner mold 360.

Electrical system 300 may further comprise inferred lighting for camera surveillance after lights-out and change light color to accommodate local turtle light laws. RF remote control RGB controllers, WI-FI RGB controllers, or smart home systems may control present invention 50. Controllers can dim, blink, strobe, control color selection, vary from color to color, or react to sound. A "react to sound" operation will change color and brightness as volume and frequency change. It can be fed by input or listen with a built-in microphone.

Figure 14:
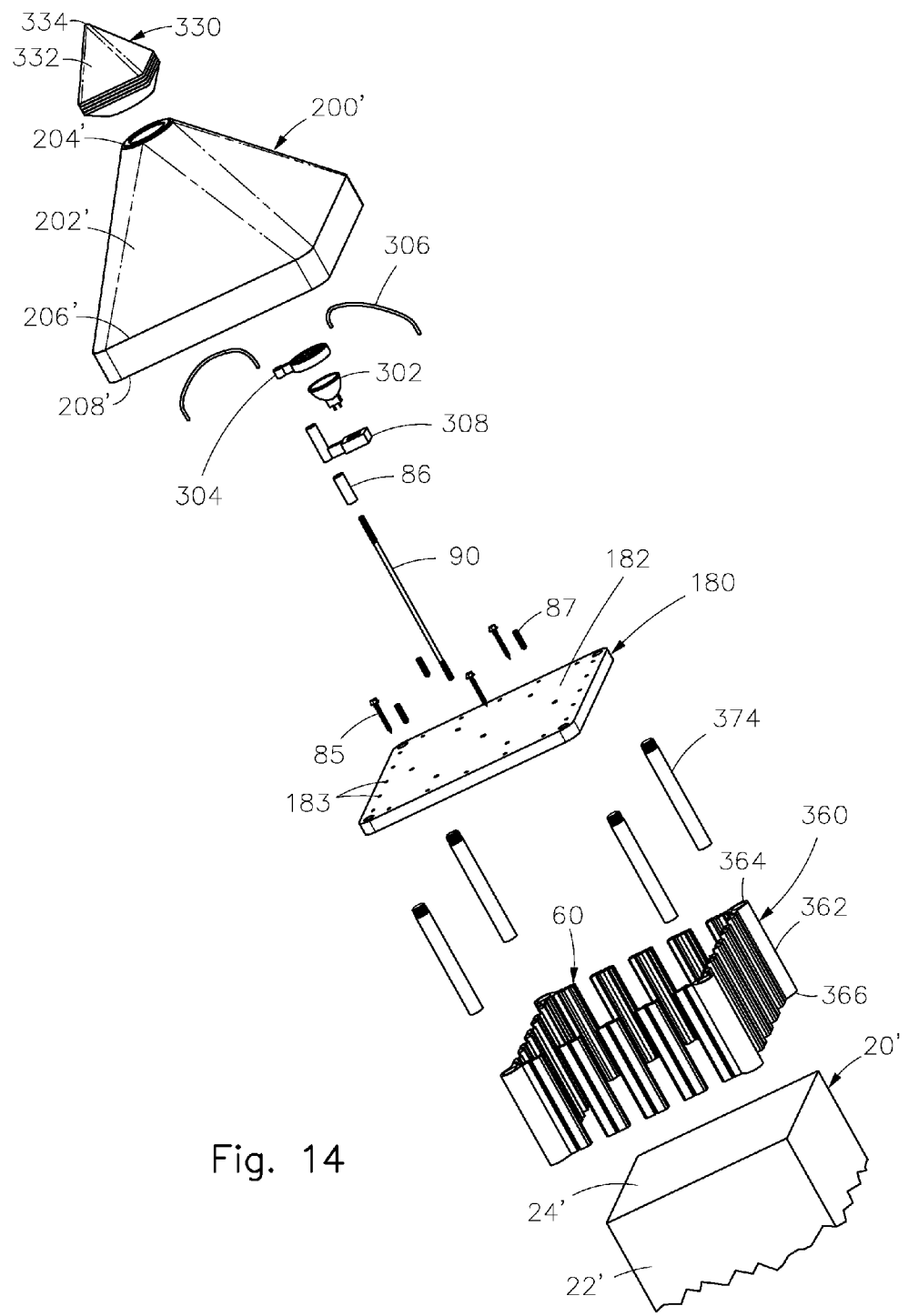
FIG. 14 is a top isometric exploded view of an alternate embodiment of the present invention on a square dock pile.
Figure 15:
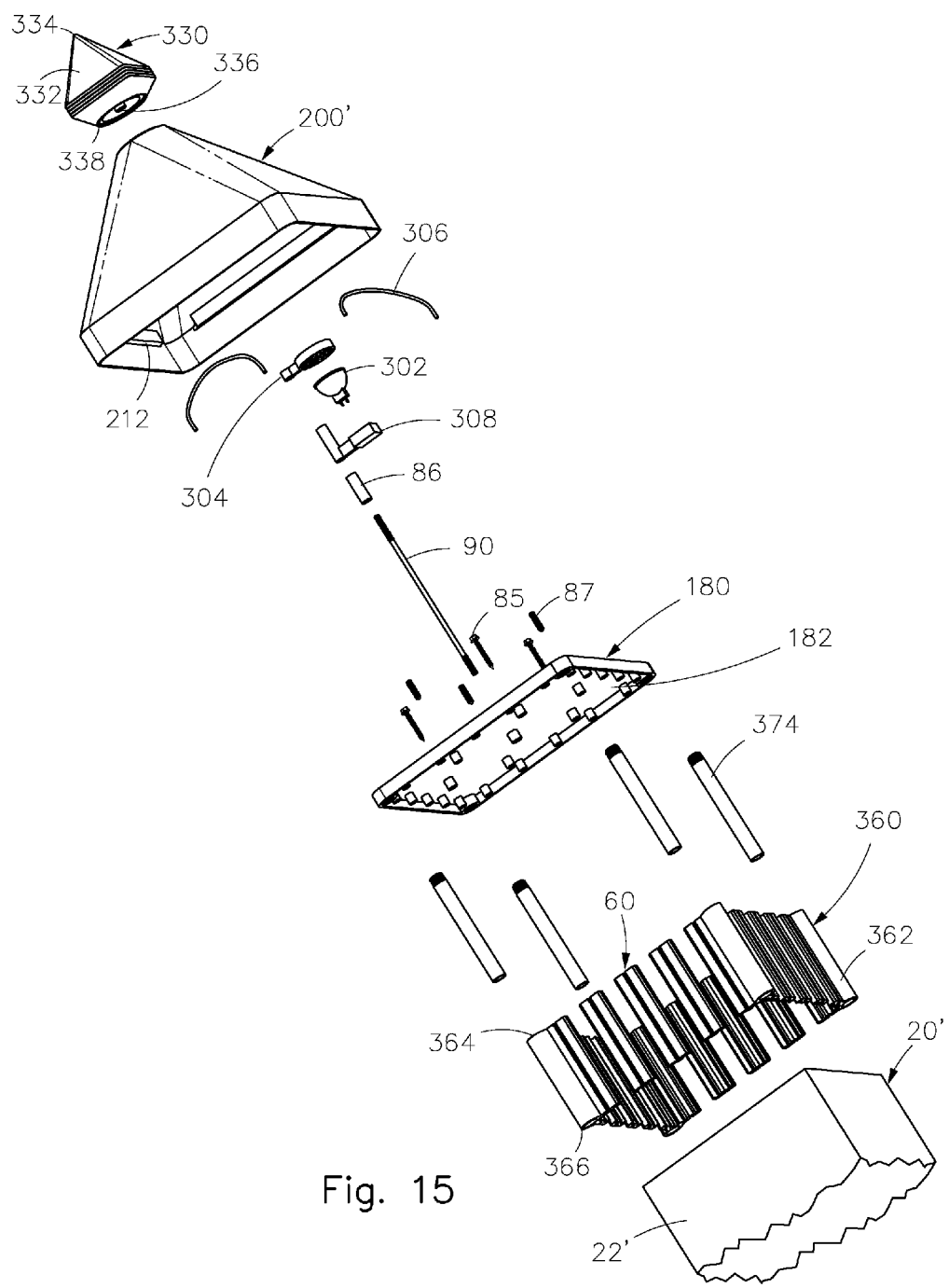
FIG. 15 is a bottom isometric exploded view of an alternate embodiment of the present invention on a square dock pile.

As seen in FIGS. 14 and 15, tip cone 330 comprises sidewall 332 extending from end 334 to edge 338. Tip cone 330 also comprises threaded hole 336 to receive mast bolt 90. Cone assembly 200' comprises sidewall 202' extending from top edge 204' to bottom edge 208', and may have transition edge 206'. Cone assembly 200' houses mast bolt 90, which extends from tip cone 330 to base 180. Secured by mast bolt 90 are optical aligner 304, bulb base 308 for bulb 302, and spacers 86. Extending from optical aligner 304 are optic fibers 306.

Mounting hardware includes mounting screws 85 and levelers 87. Base 180 comprises plate 182 having a plurality of holes 183, any of which may receive optic fiber 306 or LED 122 in the illustrated embodiments. Cone assembly 200' also comprises foot pads 212 to securely distribute down force by tip cone 330.

Square dock pile 20' comprises sidewall 22' and top wall 24'.

Figure 16A:
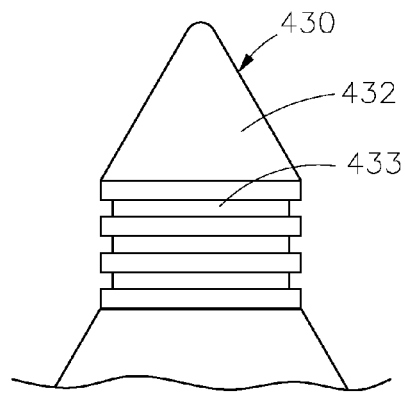
FIG. 16A is a front elevational view of a first lighted tip cone.

Seen in FIG. 16A as a first design pattern, tip cone 430 comprises sidewall 432 having light slots 433. Light slots 433 permit light to emit therethrough.

Figure 16B:
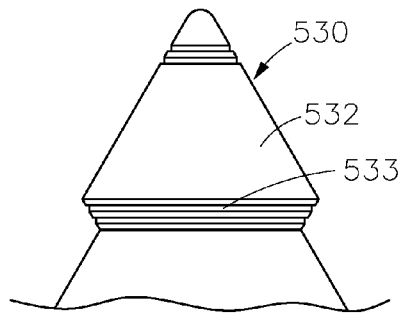
FIG. 16B is a front elevational view of a second lighted tip cone.

Seen in FIG. 16B as a second design pattern, tip cone 530 comprises sidewall 532 having light slots 533. Light slots 533 permit light to emit therethrough.

Figure 16C:
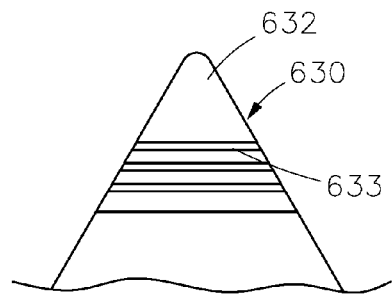
FIG. 16C is a front elevational view of a third lighted tip cone.

Seen in FIG. 16C as a third design pattern, tip cone 630 comprises sidewall 632 having light slots 633. Light slots 633 permit light to emit therethrough.

Figure 16D:
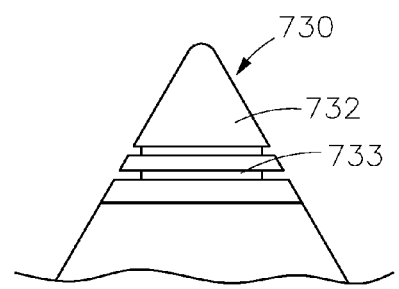
FIG. 16D is a front elevational view of a fourth lighted tip cone.

Seen in FIG. 16D as a fourth design pattern, tip cone 730 comprises sidewall 732 having light slots 733. Light slots 733 permit light to emit therethrough. It is noted that tip cones such as 430, 530, 630, and 730 may comprise any number of design patterns, colors, and/or clear sections, and are interchangeable. The light slots permit light to emit therethrough.

Figure 17A:
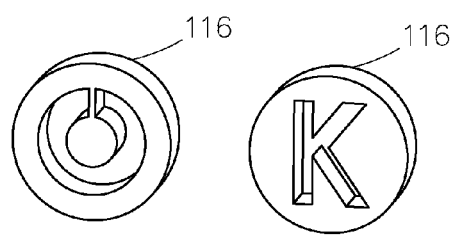
FIG. 17A shows an isometric view of two different options as sample of light stencil for optic fiber ends, O and K shape respectively.
Figure 17B:
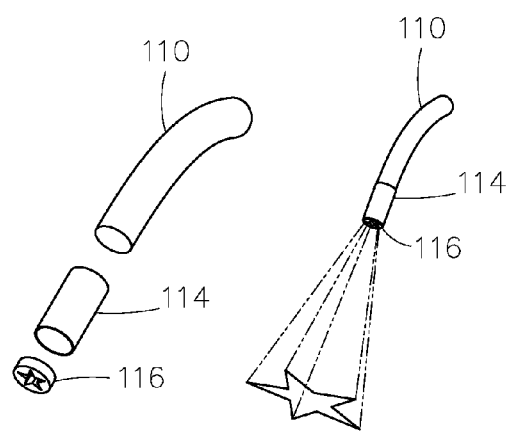
FIG. 17B shows an isometric exploded view of the light stencil using shrink tube to secure to optic fiber end.
Figure 17C:
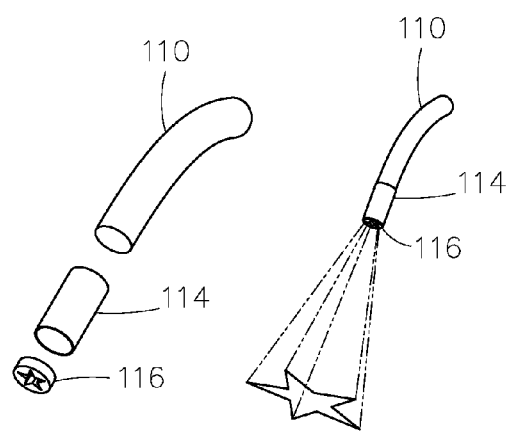
FIG. 17C shows an isometric view of the light stencil shown in FIG. 17B, assembled and showing a sample of stencil image projected on surface.

As seen in FIGS. 17A, 17B, and 17C opaque inserts, also defined as light stencils, 116 may take any design or shape. Shrink tube 114 may be used to secure insert 116 onto an end of optic fiber 110. When assembled, an image defined by insert 116 may be projected onto a surface. Such an image may spell out a word, message, and/or simply be symbolic.

As seen in FIGS. 18A, 18B, and 18C, LED module 120, having LED 122, is aligned with hole 83 of base 80. Once aligned, LED 122 is inserted into hole 83. Optic fiber 124 may be inserted into hole 83 so that LED 122 serves as a direct driver using base 80 as an optic aligner so that LED 122 can source light to an end of the optic fiber. Once assembled, cone assembly 200 is mounted thereon.

Figure 19B:
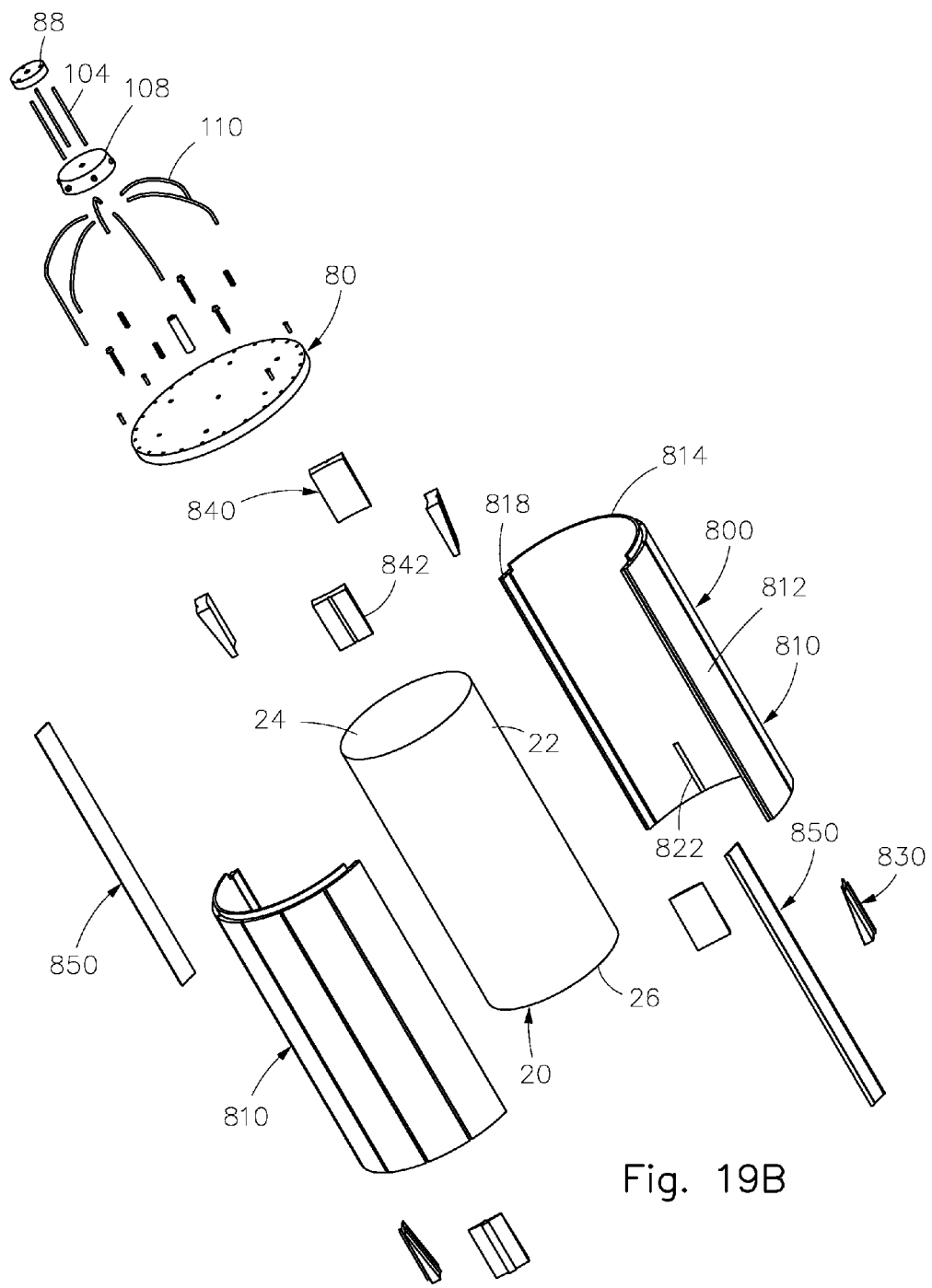
FIG. 19B is a top isometric exploded view of a dock pile and pile wrap assembly.
Figure 19C:
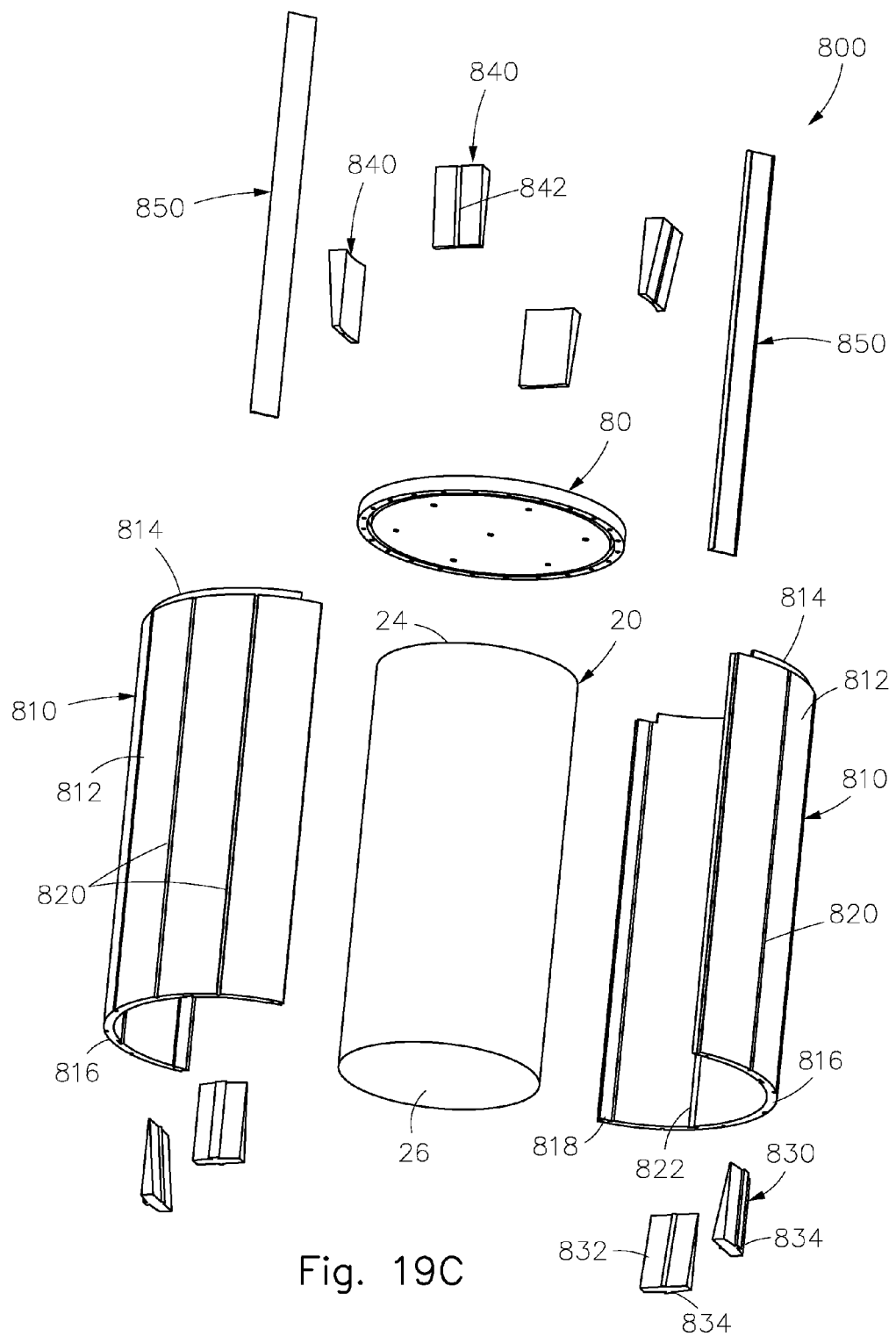
FIG. 19C is a bottom isometric exploded view of a dock pile and pile wrap assembly.
Figure 19D:
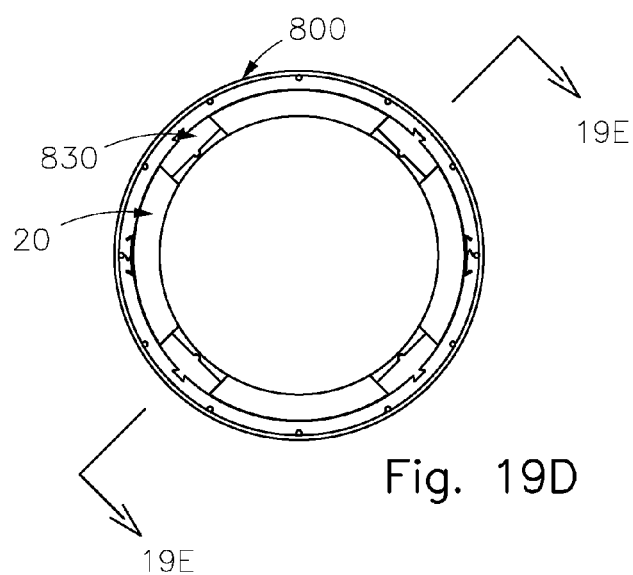
FIG. 19D is a bottom view of a dock pile having pile wrap assembly secured thereon.
Figure 19E:
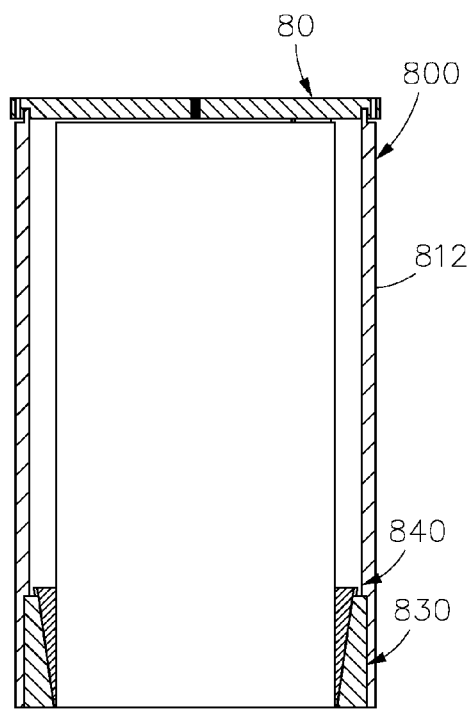
FIG. 19E is a partial cross-section view taken along lines 19E-19E from FIG. 19D.
Figure 19F:
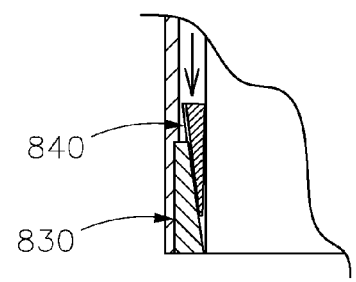
FIG. 19F is a partial cross-section view of an opposing wedge seen in FIG. 19E.

As seen in FIG. 19A, pile wrap assembly 800 is secured onto dock pile 20.

As seen in FIGS. 19B, 19C, 19D, 19E, and 19F each pile wrap assembly 800 comprises wrap 810 having sidewall 812 extending between top edge 814 and bottom edge 816. Pile wrap assembly 800 further comprises adjoining edge 818, channels 820 to receive at least one optic fiber, color bead, and/or rope lighting. Channel 820 is positioned at a seam so that the seam is hidden by the optic fiber, color bead, and/or rope lighting. Pile wrap assembly 800 further comprises interior locking channel 822. Opposing wedges 830 comprise sidewalls 832 having tongue protrusions 834. Opposing wedges 840 comprise groove 842. In addition, pile wrap assembly 800 comprises locking strips 850 that secure adjoining edges 818 together when both wraps 810 are joined around dock pile 20 in a tongue and groove fashion.

Present invention 50, and particularly flat mold 60 is made of any color and of weather, ultra violet, and impact resistant materials. Present invention 50 is also suitable for night vision use.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A dock pile cone system, comprising:
    A) a cone assembly comprising a tip cone mounted thereon, and housing a mast bolt;
    B) a base that mounts onto a dock pile of a dock platform, said mast bolt secures said cone assembly onto said base, whereby said mast bolt extends from said tip cone to said base, said base comprises levelers to level and rise or lower an overall height of said cone assembly when mounted onto said dock pile;
    C) an electrical system comprising at least one light source, said mast bolt secures said at least one light source and said base comprises a plate having at least one hole to accommodate said at least one light source, said tip cone comprises at least one light slot to emit light from said at least one light source; and
    D) a pile wrap assembly comprising at least two wraps that join around said dock pile of said dock platform, each of said at least two wraps has a top edge, a bottom edge, a first sidewall extending between said top edge and said bottom edge, adjoining edges, and channels, each of said channels receive at least one selected from the group consisting of an optic fiber and a rope lighting, whereby said optic fiber and said rope lighting extend from said at least one light source to said channels and are illuminated by said at least one light source, said channels are positioned at a seam so that said seam is hidden by said at least one selected from the group consisting of an optic fiber and a rope lighting, said pile wrap assembly further comprises an interior locking channel on said at least two wraps, a first set of opposing wedges comprising second sidewalls having tongue protrusions, and a second set of opposing wedges comprising grooves, said pile wrap assembly further comprises locking strips that secure said adjoining edges of said at least two wraps together when both said at least two wraps are joined around said dock pile in a tongue and groove fashion by said interior locking channel, said first set of opposing wedges, and said second set of opposing wedges.

2. The dock pile cone system set forth in claim 1, further characterized in that said tip cone and said cone assembly are apex shaped.

3. The dock pile cone system set forth in claim 1, further characterized in that said at least one light source emits radial and/or downward lighting onto said dock pile of said dock platform.

4. The dock pile cone system set forth in claim 1, further comprising at least one flat mold comprising at least one channel.

5. The dock pile cone system set forth in claim 4, further characterized in that said at least one flat mold comprises exterior and interior faces extending between top and bottom ends.

6. The dock pile cone system set forth in claim 1, further comprising at least one corner mold.

7. The dock pile cone system set forth in claim 6, further characterized in that said at least one corner mold comprises at least one channel.

8. The dock pile cone system set forth in claim 6, further characterized in that said at least one corner mold comprises exterior and interior faces extending between top and bottom ends.

9. The dock pile cone system set forth in claim 6, further characterized in that said at least one corner mold comprises at least one elongated cavity.

10. The dock pile cone system set forth in claim 1, further characterized in that said electrical system comprises at least one insert to define images onto a surface of said dock platform.

\* \* \* \* \*